(12) United States Patent
Tanoue

(10) Patent No.: US 10,807,810 B2
(45) Date of Patent: Oct. 20, 2020

(54) PART FEEDING APPARATUS AND PART FEEDING METHOD

(71) Applicant: KABUSHIKI KAISHA YASKAWA DENKI, Kitakyushu-shi (JP)

(72) Inventor: Yuji Tanoue, Kitakyushu (JP)

(73) Assignee: KABUSHIKI KAISHA YASKAWA DENKI, Kitakyushu-Shi (JP)

(*) Notice: Subject to any disclaimer, the term of this patent is extended or adjusted under 35 U.S.C. 154(b) by 0 days.

(21) Appl. No.: 16/038,191

(22) Filed: Jul. 18, 2018

(65) Prior Publication Data

US 2019/0023503 A1  Jan. 24, 2019

(30) Foreign Application Priority Data

Jul. 21, 2017  (JP) ................. 2017-142258

(51) Int. Cl.
| | | |
|---|---|---|
| *B25J 9/00* | (2006.01) | |
| *B65G 47/91* | (2006.01) | |
| *B65G 59/06* | (2006.01) | |
| *B25J 15/06* | (2006.01) | |
| *B23P 19/04* | (2006.01) | |

(52) U.S. Cl.
CPC ............ *B65G 47/917* (2013.01); *B23P 19/04* (2013.01); *B25J 9/0093* (2013.01); *B25J 15/0616* (2013.01); *B65G 59/063* (2013.01); *B65G 2201/0235* (2013.01)

(58) Field of Classification Search
CPC ........... B65G 47/917; B65G 59/063; B65G 2201/0235; B65G 47/90; B25J 9/0093; B25J 15/0616; B23P 19/04
See application file for complete search history.

(56) References Cited

U.S. PATENT DOCUMENTS 5,024,048 A * 6/1991 Moore .................... B65B 5/101
  221/221
2009/0279997 A1* 11/2009 Doepker .............. A61B 17/072
  414/788.7

FOREIGN PATENT DOCUMENTS

| EP | 2397413 A1 | 12/2011 |
| EP | 2799350 A1 | 11/2014 |
| JP | S54-163195 A | 12/1979 |
| JP | H09-188310 A | 7/1997 |
| JP | 2001-158533 A | 6/2001 |
| JP | 2015-077995 A | 4/2015 |
| JP | 2015-107823 | 6/2015 |
| JP | 2015107823 A * | 6/2015 |

OTHER PUBLICATIONS

Yotsuka, Yoshiki JP-2015107823-A Machine Translation (Year: 2015).*
Japanese Office Action for corresponding JP Application No. 2017-142258, dated Sep. 17, 2019 (w/ machine translation).
Korean Office Action for corresponding KR Application No. 20180084655, dated Dec. 23, 2019 (w/ machine translation).

* cited by examiner

*Primary Examiner* — Lee A Holly
(74) *Attorney, Agent, or Firm* — Mori & Ward, LLP

(57) ABSTRACT

A part feeding apparatus includes a guide, a separator, and a lift mechanism. The guide is to guide stacked parts stacked in a height direction along a height of the part feeding apparatus. The separator is configured to pick up a bottommost part located at a bottom of the stacked parts in the height direction. The lift mechanism is configured to lift the stacked parts except for at least the bottommost part.

11 Claims, 6 Drawing Sheets

PART FEEDING APPARATUS AND PART FEEDING METHOD

CROSS-REFERENCE TO RELATED APPLICATION

This application claims priority from Japanese Patent Application No. 2017-142258 filed with the Japan Patent Office on Jul. 21, 2017, the entire content of which is hereby incorporated by reference.

BACKGROUND

1. Field of the Invention

An embodiment of the present disclosure relates to a part feeding apparatus and a part feeding method.

2. Description of the Related Art

A container feeding apparatus is described in JP-A-2015-107823. The container feeding apparatus includes a fork member that supports a required number of containers. The fork member is moved along a guide path to an ejection position and is withdrawn to the outside of the guide path. Containers are then dropped. Accordingly, the containers are fed to a container separation mechanism. The container separation mechanism supports a plurality of stacked containers, and also separates the containers, one by one, from the plurality of containers supported.

SUMMARY

According to one aspect of the present disclosure, a part feeding apparatus includes a guide, a separator, and a lift mechanism. The guide is to guide stacked parts stacked in a height direction along a height of the part feeding apparatus. The separator is configured to pick up a bottommost part located at a bottom of the stacked parts in the height direction. The lift mechanism is configured to lift the stacked parts except for at least the bottommost part.

According to another aspect of the present disclosure, a part feeding method includes lifting stacked parts in a height direction along a height of a guide except for at least bottommost part. The stacked parts are stacked in the height direction. The bottommost part is located at a bottom of the stacked parts in the height direction. The bottommost part is picked up.

DESCRIPTION OF THE EMBODIMENTS

Figure 1:
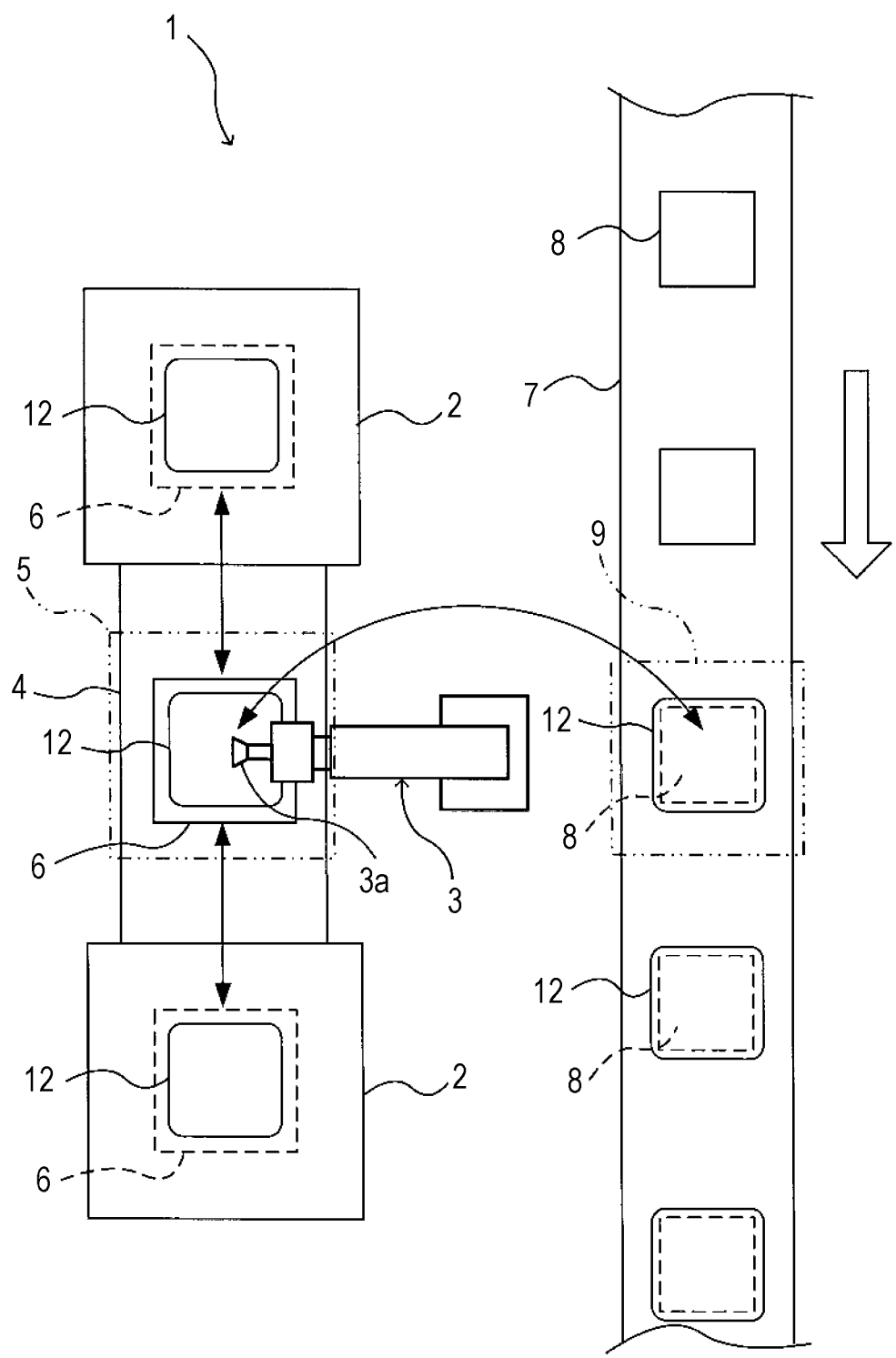
FIG. 1 is an explanatory view illustrating an example of the entire configuration of a lid closing system including a lid feeding apparatus according to the embodiment.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

An embodiment is described hereinafter with reference to the drawings. The embodiment is an example in which a container feeding apparatus according to the present disclosure is applied to a lid feeding apparatus that feeds lids to be mounted on food containers. Directions such as up, down, left, right, front, and back may be used below as appropriate for convenience of description of the configurations of the lid feeding apparatus and the like. However, they do not limit the positional relationship of each configuration of the lid feeding apparatus and the like.

<1. Entire Configuration of Lid Closing System>

Firstly, an example of the entire configuration of a lid closing system 1 including a lid feeding apparatus 2 according to the embodiment is described with reference to FIG. 1.

As illustrated in FIG. 1, the lid closing system 1 (an example of a container mounting system) includes two lid feeding apparatuses 2, a lid closing robot 3, a lid transport apparatus 4, and a container transport conveyor 7.

A plurality of lids 12 (an example of containers) stacked in the up-and-down direction is stored in the lid feeding apparatus 2. A lid tray 6 is placed below the plurality of lids 12. The lid feeding apparatus 2 separates the lids 12, one by one, from the bottom of the plurality of stacked lids 12, and loads the lid 12 onto the lid tray 6 placed below. The lid transport apparatus 4 transports the lid tray 6 on which the lid 12 is loaded, alternately from the two lid feeding apparatuses 2 to a lid receiving position 5 of the lid closing robot 3.

The container transport conveyor 7 transports a plurality of food containers 8 (an example of other containers) in which food such as rice or a prepared food has been arranged, in the transport direction at regular intervals. The container transport conveyor 7 repeats transport and stop, and during that time the operation may be stopped. Alternatively, the container transport conveyor 7 may continuously perform continuous operation of transporting the food containers 8. The lid closing robot 3 (an example of a container mounting robot) is, for example, a vertical or horizontal articulated robot. This robot includes a suction pad 3a at a tip thereof. The lid closing robot 3 suctions and holds the lid 12 transported to the lid receiving position 5, using the suction pad 3a. The lid closing robot 3 then rotates approximately 180° in the horizontal direction, moves the lid 12 to a lid closing position 9, and mounts the lid 12 on the food container 8 that is on the move or at rest.

In the above-mentioned lid closing work, it is requested to reduce cycle time of each work step (to improve takt time). However, it is difficult to improve takt time for the work step performed by the lid feeding apparatus 2 (the work step of separating the lids 12, one by one, from the plurality of stacked lids 12) among the work steps of the lid closing work. Hence, in the lid closing system 1, the two lid feeding apparatuses 2 are placed to perform the work step of feeding the lids 12 in parallel, which allows a reduction in cycle time. A further reduction in cycle time may be performed by installing three or more lid feeding apparatuses 2, or the number of the lid feeding apparatuses 2 may be one if a reduction in cycle time is not particularly required.

If a plurality of the lid feeding apparatuses 2 is installed, the lid closing system 1 may be configured in such a manner that two lid feeding apparatuses 2 are placed on both sides of the lid closing robot 3, respectively, to alternately feed the lids 12, as in the embodiment. In addition, the lid closing system 1 may be configured in such a manner that a plurality of the lid feeding apparatuses 2 is placed in series on one side of the lid closing robot 3 to sequentially and continuously feed the lids 12. In this case, many lids 12 can be stocked by increasing the number of the lid feeding apparatuses 2 installed. Hence, there is an advantage that the interval between supplies of the lids 12 to the lid feeding apparatus 2 can be increased.

<2. Configuration of Lid Feeding Apparatus>

Next, an example of the configuration of the lid feeding apparatus 2 is described with reference to FIGS. 2 and 3. The lid feeding apparatus 2 is an example of the container feeding apparatus.

Figure 2:
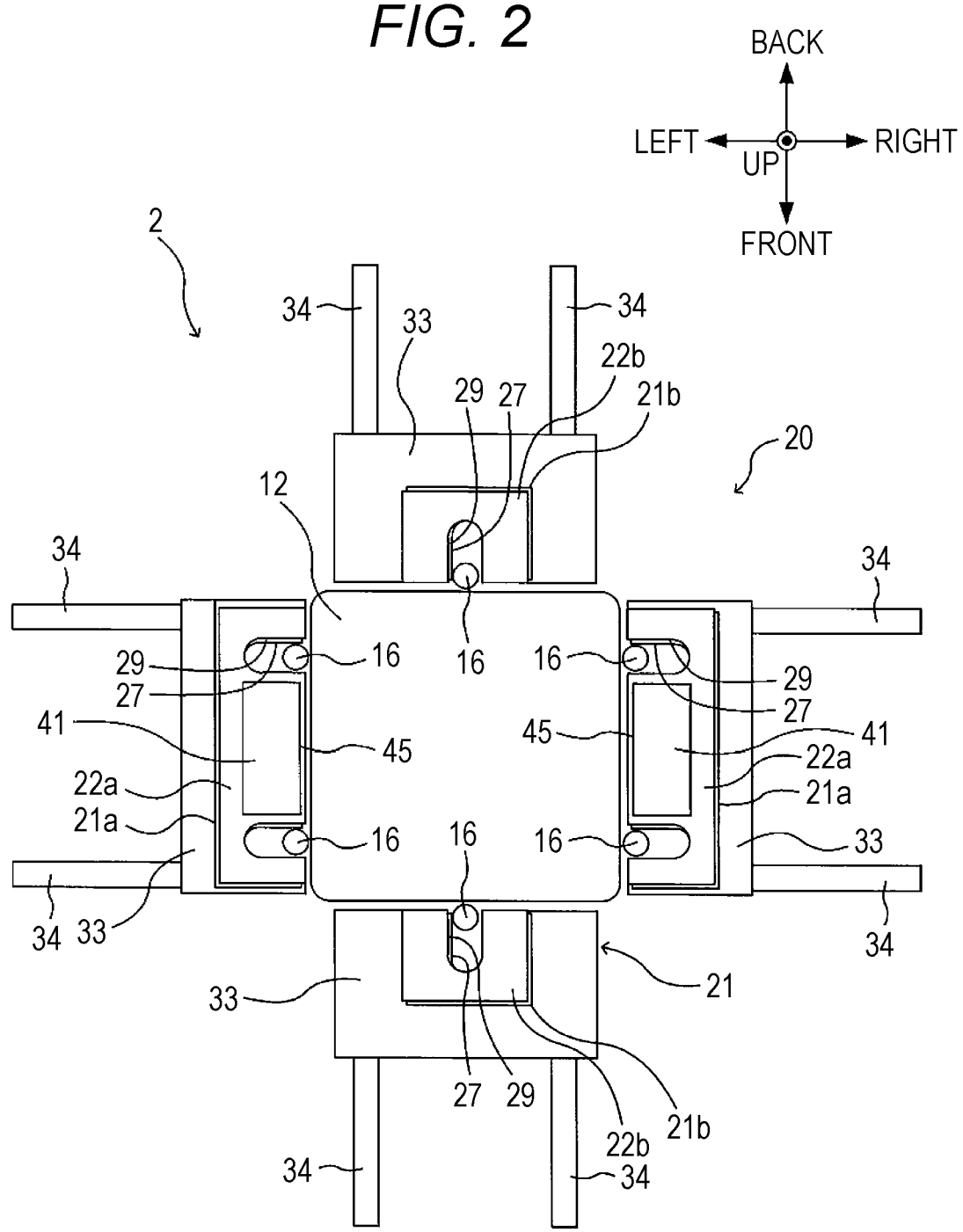
FIG. 2 is a plan view illustrating an example of the configuration of the lid feeding apparatus.
Figure 3:
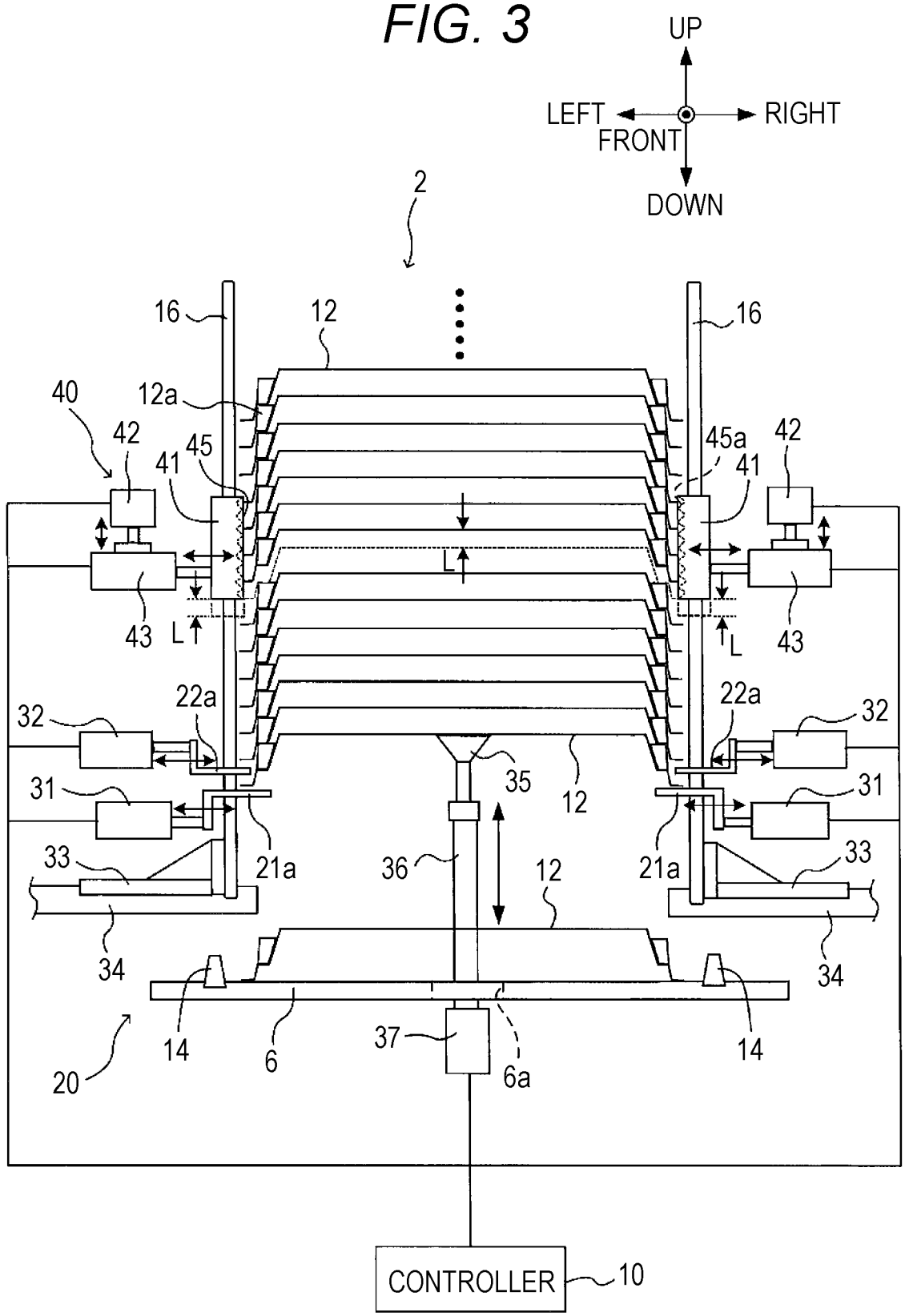
FIG. 3 is a side view illustrating an example of the configuration of the lid feeding apparatus.

As illustrated in FIGS. 2 and 3, the lid feeding apparatus 2 includes a plurality of guide bars 16 (an example of guide members), a separation mechanism 20, and a lift mechanism (a lift) 40.

(2-1. Guide Bars)

The guide bar 16 is a member (for example, a pipe) that guides the stacking direction in contact with an outer peripheral portion of the lid 12. The guide bar 16 is vertically arranged along the up-and-down direction. In this example, the lid 12 is a shallow dish-shaped container having a substantially square shape when viewed from the up-and-down direction. A plurality of (for example, 100 to 150) lids 12 is stacked along the guide bars 16 in the up-and-down direction.

As illustrated in FIG. 3, a stack protrusion 12a for preventing the lid 12 from being fitted into another lid 12 is provided at an appropriate position near the outer peripheral portion of the lid 12. The lids 12 are stacked in such a manner that the stack protrusions 12a are in contact with their adjacent lids 12. As illustrated in FIG. 2, the guide bars 16 are placed at six points in all, for example, two points on each of the left and right sides and one point on each of the front and back sides, of the plurality of stacked lids 12. The number and the placement of the guide bars 16 may be other than those described above as long as the guide bars 16 can guide the lids 12 in the stacking direction of the lids 12. The left guide bards 16, as well as the right guide bars 16, are placed, spaced a predetermined distance apart in the front-and-back direction, in such a manner as to sandwich a pinching claw 41 described below. The front and back guide bars 16 are placed in such a manner as to be in contact with substantially center portions, in the left-and-right direction, of the outer peripheral portions of the stacked lids 12.

(2-2. Separation Mechanism)

The separation mechanism 20 is a mechanism for separating the lids 12, one by one, from the plurality of lids 12 stacked along the guide bars 16. The separation mechanism 20 includes lower claws 21, upper claws 22, a suction pad 35, third actuators 31, fourth actuators 32, and a fifth actuator 37. The lower claw 21 and the upper claw 22 are configured in such a manner as to be replaceable according to the shape or size of the lid 12. In FIG. 2, illustrations of the actuators 31 and 32 and the like are omitted.

As illustrated in FIG. 3, the lower claw 21 (an example of a second support member) is a member that supports the lid 12 located at the bottom of the stacked lids 12. As illustrated in FIG. 2, the lower claws 21 placed on the left and right sides of the lid 12 are described below as the lower claws 21a, and the lower claws 21 placed on the front and back sides as the lower claws 21b.

As illustrated in FIG. 2, the left and right sides of the lower claws 21a are plate-shaped members that are bilaterally symmetrical to each other. Two long holes 27 that allow the guide bar 16 to be housed therethrough are provided on a side, which faces the lid 12, of the lower claw 21a in such a manner as to open toward the lid 12. The front and back sides of the lower claws 21b are plate-shaped members that are vertically symmetrical to each other. One long hole 27 that allows the guide bar 16 to be housed therethrough is provided on a side, which faces the lid 12, of the lower claw 21b in such a manner as to open toward the lid 12. The long holes 27 allow the lower claws 21a and 21b to move to and away from the lid 12 while avoiding an interference with the guide bar 16.

As illustrated in FIG. 3, the upper claw 22 (an example of a third support member) is a member that supports the second lid 12 from the bottom of the stacked lids 12. As illustrated in FIG. 2, the upper claws 22 placed on the left and right sides of the lid 12 are described below as the upper claws 22a, and the upper claws 22 placed on the front and back sides as the upper claws 22b.

As illustrated in FIG. 2, the left and right sides of the upper claws 22a are plate-shaped members that are bilaterally symmetrical to each other. Two long holes 29 that allow the guide bar 16 to be housed therethrough are provided on a side, which faces the lid 12, of the upper claw 22a in such a manner as to open toward the lid 12. The front and back upper sides of the claws 22b are plate-shaped members that are vertically symmetrical to each other. One long hole 29 that allows the guide bar 16 to be housed therethrough is provided on a side, which faces the lid 12, of the upper claw 22b in such a manner as to open toward the lid 12. The long holes 29 allow the upper claws 22a and 22b to move to and away from the lid 12 while avoiding an interference with the guide bar 16.

As illustrated in FIG. 3, the third actuator 31 includes, for example, an air cylinder. The third actuator 31 is provided to each of the four lower claws 21 (21a, 21a, 21b, and 21b). The third actuator 31 moves the lower claw 21 to and fro in a horizontal direction (an example of a direction that intersects with the guide member). When the third actuator 31 moves the lower claw 21 to the lid 12 side, the lower claw 21 supports the lid 12 located at the bottom of the plurality of stacked lids 12. On the other hand, when the third actuator 31 withdraws the lower claw 21 to a side opposite to the lids 12, the lower claw 21 releases the lid 12.

The fourth actuator 32 includes, for example, an air cylinder. The fourth actuator 32 is provided to each of the four upper claws 22 (22a, 22a, 22b, and 22b). The fourth actuator 32 moves the upper claw 22 to and fro in the horizontal direction (the example of the direction that intersects with the guide member). When the fourth actuator 32 moves the upper claw 22 to the lid 12 side, the upper claw 22 supports the second lid 12 from the bottom of the plurality of stacked lids 12. On the other hand, when the fourth actuator 32 withdraws the upper claw 22 to the side opposite to the lids 12, the upper claw 22 releases the lid 12.

The suction pad 35 is mounted at an upper end of a rod 36 that extends in the up-and-down direction. The rod 36 is provided in such a manner as to be movable in the up-and-down direction, penetrating an opening 6a provided in substantially the center of the lid tray 6 located below. The suction pad 35 suctions the lid 12 located at the bottom of the plurality of stacked lids 12. The fifth actuator 37 includes, for example, a servo motor, and is placed below the lid tray 6. The fifth actuator 37 moves the suction pad 35 up and down in the up-and-down direction via the rod 36. After suctioning the lid 12, the suction pad 35 is moved down by the fifth actuator 37. Consequently, the lid 12 at the bottom is separated and moved to a position in close proximity to the lid tray 6. After the suction by the suction pad 35 is released, the lid 12 is loaded onto the lid tray 6. A plurality of stoppers 14 that prevents the slippage of the lid 12 is provided on an upper surface of the lid tray 6. The lid transport apparatus 4 transports the lid 12 loaded on the lid tray 6 to the lid receiving position 5 of the lid closing robot 3.

(2-3. Lift Mechanism)

The lift mechanism 40 is a mechanism for supporting the remaining lids 12 excluding at least one (for example, seven in the example illustrated in FIG. 3) lid 12 from the bottom of the plurality of stacked lids 12, and lifting the remaining lids 12 up a predetermined distance L when the separation mechanism 20 separates the lid 12.

The lift mechanism 40 includes the pinching claws 41 (an example of first support members), first actuators 42, and second actuators 43. In FIG. 2, illustrations of the actuators 42 and 43 and the like are omitted.

As illustrated in FIG. 2, the pinching claw 41 is formed in, for example, a cuboid, and a pair of the pinching claws 41 is provided on, for example, the left and right sides of the lid 12. The pinching claws 41 are members that pinch and support the remaining lids 12 from both of the left and right sides. The pinching claw 41 includes an uneven shape 45a (refer to FIG. 3) on a contact surface 45 with the lid 12. The material of the pinching claw 41 is not especially limited. The material is preferably, for example, a rubber material or a resin material. However, the pinching claw 41 may be formed of a metal material or the like. The pinching claw 41 is configured in such a manner as to be replaceable according to the shape or size of the lid 12.

The first actuator 42 and the second actuator 43 include, for example, an air cylinder. The first actuator 42 and the second actuator 43 are provided to each of the left and right pinching claws 41. The second actuator 43 moves the pinching claw 41 to and fro in the horizontal direction (an example that intersects with the guide member). When the second actuators 43 move the pinching claws 41 to the lid 12 side, the pinching claws 41 come into contact with the outer peripheries of a plurality of (in the example, four) lids 12 located immediately above a plurality of (in the example, seven) lids 12 from the bottom, meanwhile supporting the remaining lids 12 (including the four lids 12 in contact and a plurality of lids 12 located above the four lids 12). On the other hand, when the second actuators 43 withdraw the pinching claws 41 to the side opposite to the lids 12, the pinching claws 41 release the lids 12.

The first actuator 42 moves the second actuator 43 up and down in the up-and-down direction (an example of a direction along the guide member) to move the pinching claw 41 up and down in the up-and-down direction. The lift amount (the predetermined distance L) of the pinching claw 41 by the first actuator 42 is not especially limited as long as the plurality of (in the example, seven) lids 12 from the bottom can be released from the weight of the remaining lids 12 above. In the embodiment, the lift distance L is, for example, approximately 3 to 5 mm.

The number of (in the above example, seven) the lids 12 left without being lifted up by the lift mechanism 40 is not especially limited as long as the weight acting on the bottom lid 12, or the second lid 12 from the bottom, is sufficiently reduced considering, for example, the strength of the lid 12. For example, the second and more lids 12 from the bottom may be lifted up, leaving only the bottom lid 12, or approximately 10 to 15 bottom lids 12 may be left.

(2-4. Moving Mechanism of Guide Bars, Claws, Actuators, and the Like)

The two guide bars 16, the pinching claw 41, the lower claw 21a, the upper claw 22a, and the actuators 31, 32, 42, and 43, which are placed on each of the left and right sides of the lid 12, are installed on a base 33 via an unillustrated support member. Moreover, the one guide bar 16, the lower claw 21b, the upper claw 22b, and the actuators 31 and 32, which are placed on each of the front and back sides of the lid 12, are installed on a base 33 via an unillustrated support member. These bases 33 are each supported by a plurality of (in the example, two) rails 34 in such a manner as to be movable along the horizontal direction (the example of the direction that intersects with the guide member). Consequently, the guide bars 16, the pinching claws 41, the lower claws 21, the upper claws 22, and the like, which are placed on four (upper, lower, left, and right) sides of the lid 12, are moved according to the shape and size of the lid 12. In this manner, it is possible to flexibly handle the lids 12 having various shapes and sizes.

(2-5. Controller)

As illustrated in FIG. 3, the operation of the above-mentioned first actuators 42, second actuators 43, third actuators 31, fourth actuators 32, and fifth actuator 37 is controlled by a controller 10 (an example of a control device). Moreover, the suction and release of the suction pad 35 is also controlled by the controller 10. Although an illustration is omitted, the controller 10 is configured as a computer including, for example, a CPU, a ROM, or a RAM.

(3. Lid Feeding Operation of Lid Feeding Apparatus)

Next, an example of the lid feeding operation of the lid feeding apparatus 2 is described with reference to FIG. 4.

Figure 4:
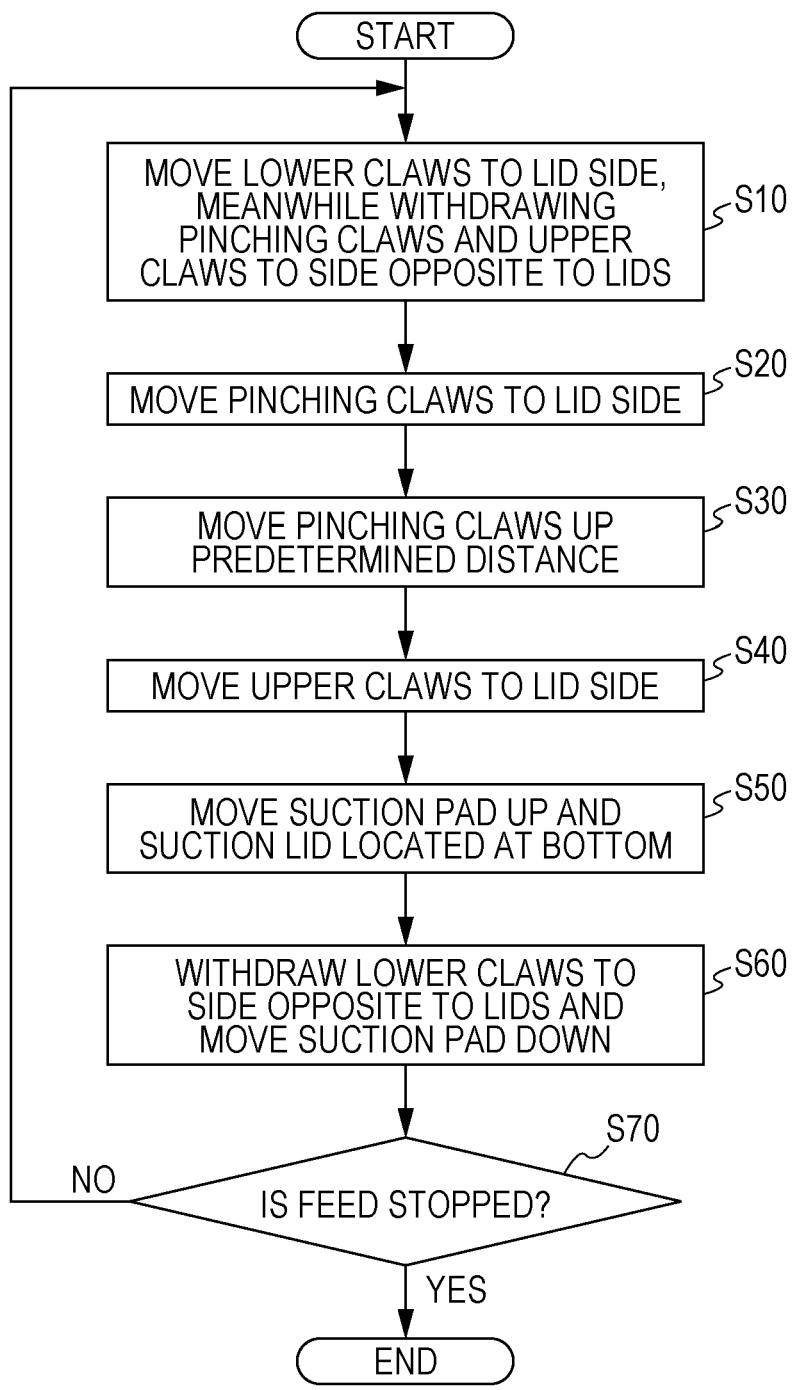
FIG. 4 is a flowchart illustrating an example of a lid feeding operation of the lid feeding apparatus.

As illustrated in FIG. 4, in step S10 (an example of a first step), the controller 10 drives the third actuators 31, the second actuators 43, and the fourth actuators 32. In other words, the controller 10 moves the lower claws 21 (21a, 21a, 21b, and 21b) to the lid 12 side. At the same time, the controller 10 withdraws the pinching claws 41 and the upper claws 22 (22a, 22a, 22b, and 22b) to the side opposite to the lids 12. Consequently, the lower claws 21 are inserted into below the lid 12 located at the bottom of the plurality of stacked lids 12. The inserted lower claws 21 support the plurality of stacked lids 12. Moreover, the pinching claws 41 and the upper claws 22 release the lids 12.

In step S20 (an example of a second step), the controller 10 drives the second actuators 43 to move the pinching claws 41 to the lid 12 side. Consequently, the pinching claws 41 come into contact with the outer peripheries of a plurality of (in this example, four) lids 12 located immediately above a plurality of (in this example, seven) ids 12 from the bottom and support the remaining lids 12 excluding the plurality of lids 12 near the bottom.

In step S30 (an example of a third step), the controller 10 drives the first actuators 42 to move the pinching claws 41 up the predetermined distance L. Consequently, the remaining lids 12 excluding the plurality of lids 12 near the bottom enter a state of being lifted up the predetermined distance L. As a result, the plurality of lids 12 near the bottom is released from the weight of the remaining lids 12.

In step S40 (an example of a fourth step), the controller 10 drives the fourth actuators 32 to move the upper claws 22 to the lid 12 side. Consequently, the upper claws 22 are inserted into between the outer peripheral portion of the bottom lid 12 and the outer peripheral portion of the second lid 12 from the bottom. Consequently, the second lid 12 from the bottom is supported by the upper claws 22.

In step S50 (an example of a fifth step), the controller 10 drives the fifth actuator 37 to move the suction pad 35 up and suction the lid 12 located at the bottom.

In step S60 (an example of a sixth step), the controller 10 drives the third actuators 31 and the fifth actuator 37. In other words, the controller 10 withdraws the lower claws 21 to the side opposite to the lids 12, meanwhile moving the suction pad 35 down. Consequently, the lid 12, located at the bottom, suctioned by the suction pad 35 is released from the lower claws 21. Furthermore, the lid 12 is moved down by the suction pad 35. After the suction by the suction pad 35 is released, the lid 12 is loaded onto the lid tray 6.

In step S70, the controller 10 determines whether or not to stop feeding the lids 12. For example, if a worker performs a feed stop operation as appropriate, or if it has been detected that the lids 12 stored in the lid feeding apparatus 2 had run out, the determination in step S70 is satisfied (S70: YES), and the controller 10 stops feeding the lids 12. This flow then ends. On the other hand, if the feed stop operation is not performed and there are still the stored lids 12, the determination in step S70 is not satisfied (S70: NO). Hence, this flow returns to the above step S10. The controller 10 then repeats a similar procedure.

When the flow returns to step S10, the lower claws 21 are moved to the lid 12 side as described above. At the same time, the pinching claws 41 and the upper claws 22 are withdrawn to the side opposite to the lids 12. Consequently, the plurality of lids 12 (the remaining lids 12 excluding the plurality of lids 12 near the bottom) that were lifted up by the pinching claws 41 in the above step S30 and the plurality of lids 12 (the plurality of lids 12 near the bottom excluding the bottom lid 12) that were supported by the upper claws 22 in the above step S40 are released and dropped onto the lower claws 21 to be supported.

<4. Effects of Embodiment>

As described above, the lid feeding apparatus 2 of the embodiment includes the guide bars 16 that guide the stacking direction of the lids 12, the separation mechanism 20 that separates the lids 12, one by one, from a plurality of the lids 12 stacked along the guide bars 16, and the lift mechanism 40 that, when the separation mechanism 20 separates the lids 12, supports the remaining lids 12 excluding at least one lid 12 from the bottom of the plurality of the stacked lids 12, and lifts the remaining lids 12 up the predetermined distance L. Consequently, the following effects are exerted.

In other words, the separation mechanism 20 of the lid feeding apparatus 2 inserts the upper claws 22 into between the lid 12 located at the bottom of the stacked lids 12 and the second lid 12 from the bottom. Consequently, the separation mechanism 20 separates the lids 12, one by one, from the stacked lids 12. At this point in time, for example, if the strength of the lid 12 is low, or if the number of the stacked lids 12 is high, the lids 12 near the bottom may deform under the weight of the lids 12 above. In this case, the upper claws 22 may not be able to be inserted at appropriate positions due to, for example, a change in the pitch between the lids 12. Alternatively, even if the upper claws 22 can be inserted (for example, if the lid has a shape that only allows shallow insertion of the upper claws 22), the lids 12 may not be able to be fed one by one due to, for example, the drop of the lids 12 from the upper claws 22.

According to the embodiment, when the separation mechanism 20 separates the lids 12, the lift mechanism 40 supports the remaining lids 12 excluding at least one lid 12 from the bottom of the plurality of stacked lids 12, and lifts the remaining lids 12 up the predetermined distance L. Consequently, the lid(s) 12 near the bottom can be released from the weight of the remaining lids 12. Hence, even if the lid 12 has deformed, the deformation can be solved. Hence, the upper claws 22 can be inserted at appropriate positions. Moreover, the weight hardly acts on the lid(s) 12 near the bottom. Hence (for example, even if the lid has a shape that only allows shallow insertion of the upper claws 22), it is possible to prevent the lids 12 from dropping from the upper claws 22. Therefore, it is possible to feed the lids 12 one by one irrespective of the strength of the lid 12 or the number of stacked lids 12.

Moreover, especially in the embodiment, the lift mechanism 40 includes the pinching claws 41 that support the remaining lids 12, the first actuators 42 that move the pinching claw 41 up and down in the up-and-down direction, and the second actuators 43 that move the pinching claw 41 to and fro in the horizontal direction.

With such a configuration, it is possible to realize the lift mechanism 40 that supports the remaining lids 12 excluding at least one lid 12 from the bottom of a plurality of stacked lids 12, and lifts the remaining lids 12 up a predetermined distance.

Moreover, especially in the embodiment, the pinching claws 41 support the remaining lids 12 while in contact with the outer peripheries of a plurality of the lids 12 located immediately above at least one lid 12 at the bottom. Consequently, the following effects are exerted.

In other words, if the pinching claw 41 is a member that is inserted into between the lids 12 to support the lids 12, when the lid 12 near the insertion position deforms under the weight of the lids 12 above, the pinching claws 41 may not be able to be inserted at appropriate positions due to, for example, a change in the pitch between the lids 12. Alternatively, even if the pinching claws 41 can be inserted, the support of the lids 12 may become unstable due to, for example, the drop of the lids 12 from the pinching claws 41.

According to the embodiment, the pinching claw 41 is a member that comes into contact with the outer peripheries of a plurality of the lids 12. Hence, even if the pitch between the lids 12 has been changed due to the occurrence of the deformation of the lid 12 near the position supported by the pinching claws 41, it is possible to hold the lids 12 with the pinching claws 41. Hence, a plurality of the lids 12 supported becomes more stable. Moreover, the pinching claws 41 are not configured in such a manner as to be inserted into between the lids 12. Hence, accuracy is not required in the placement (such as the installation height) of the pinching claws 41. Hence, the degree of freedom in design is high.

Moreover, especially in the embodiment, the pinching claw 41 is made of a rubber material, and includes the uneven shape 45a on the contact surface 45 with the lid 12.

Consequently, the slippage between the pinching claw 41 and the lid 12 can be prevented. Hence, a plurality of the lids 12 supported becomes more stable.

Moreover, especially in the embodiment, the separation mechanism 20 includes the lower claws 21 (21a and 21b)

that support the lid 12 located at the bottom of the stacked lids 12, the third actuators 31 that move the lower claw 21 to and fro in the horizontal direction, the upper claws 22 (22a and 22b) that support the second lid 12 from the bottom of the stacked lids 12, and the fourth actuators 32 that move the upper claw 22 to and fro in the horizontal direction.

According to the embodiment, the lower claws 21 are moved to the lid 12 side, meanwhile the upper claws 22 are withdrawn to the side opposite to the lids 12. Consequently, the stacked lids 12 are supported. In this state, the upper claws 22 are moved to the lid 12 side, meanwhile the lower claws 21 are withdrawn to the side opposite to the lids 12. Accordingly, it is possible to release the bottom lid 12 while supporting the second lid 12 from the bottom. Consequently, it is possible to realize the separation mechanism 20 that separates the lids 12, one by one, from a plurality of the lids 12 stacked along the guide bars 16.

Moreover, especially in the embodiment, the separation mechanism 20 includes the suction pad 35 that suctions the lid 12 located at the bottom, and the fifth actuator 37 that moves the suction pad 35 up and down in the up-and-down direction. Consequently, the following effects are exerted.

In other words, if the separation mechanism 20 employs a method in which the upper claws 22 are moved to the lid 12 side to support the second lid 12 from the bottom, and the lower claws 21 are withdrawn to the side opposite to the lids 12; accordingly, the lid 12 located at the bottom is released to drop under its own weight, a separation may not be made successfully and the lids 12 may become unstable, depending on the type of the lid 12 (for example, a lid that is high in the up-and-down direction or a lid whose center of gravity is off-center).

According to the embodiment, the suction pad 35 suctions the lid 12 and forcibly separates it. Hence, the lid 12 that is separated by the separation mechanism 20 becomes more stable.

Moreover, especially in the embodiment, included are the bases 33 that support the guide bars 16, the pinching claws 41, the lower claws 21, and the upper claws 22, and the rails 34 that support the base 33 in such a manner as to be movable along the horizontal direction.

According to the embodiment, the base 33 moves along the rails 34. Consequently, it is possible to integrally move the guide bar 16, the pinching claw 41, the lower claw 21, the upper claw 22, and the like in the horizontal direction. Consequently, it is possible to flexibly handle the lids 12 having various shapes and sizes.

Moreover, especially in the embodiment, the pinching claws 41, the lower claws 21, and the upper claws 22 are configured in such a manner as to be replaceable according to the shape of the lid 12.

According to the embodiment, the pinching claws 41, the lower claws 21, and the upper claws 22 can be replaced according to the shape of the lid 12. Accordingly, the lids 12 of various shapes can be flexibly handled.

Moreover, in the embodiment, especially, the first actuators 42, the second actuators 43, the third actuators 31, the fourth actuators 32, and the fifth actuator 37 are controlled by the controller 10. In other words, the controller 10 executes step S10 of moving the lower claws 21 to the lid 12 side, meanwhile withdrawing the pinching claws 41 and the upper claws 22 to the side opposite to the lids 12, step S20 of moving the pinching claws 41 to the lid 12 side, step S30 of moving the pinching claws 41 up the predetermined distance L, step S40 of moving the upper claws 22 to the lid 12 side, step S50 of moving the suction pad 35 up to suction the lid 12 located at the bottom, and step S60 of withdrawing the lower claws 21 to the side opposite to the lids 12 and moving the suction pad 35 down.

Such a procedure is executed. Accordingly, it is possible to separate and feed the lids 12, one by one, while releasing the lids 12 near the bottom of a plurality of the lids 12 stacked along the guide bars 16 from the weight of the remaining lids 12.

<5. Modifications>

Embodiments of the present disclosure are not limited to the above-described embodiment. Various modifications can be made to the above-described embodiment within the scope that does not depart from the gist and technical idea of the present disclosure. Such modifications are described below.

As described above, the lid feeding apparatus 2 can handle the lids 12 of various shapes by replacing the pinching claws 41, the lower claws 21, and the upper claws 22 according to the shape of the lid 12. The details are described below. Illustrations of the bases 33, the rails 34, the actuators, and the like are omitted in the following FIGS. 5 to 8 to avoid complexity.

(5-1. Case of Feeding Rectangular Lids)

This modification is an example where the lid feeding apparatus is applied for rectangular lids. An example of the configuration of a lid feeding apparatus 2A of this modification is illustrated in FIG. 5.

Figure 5:
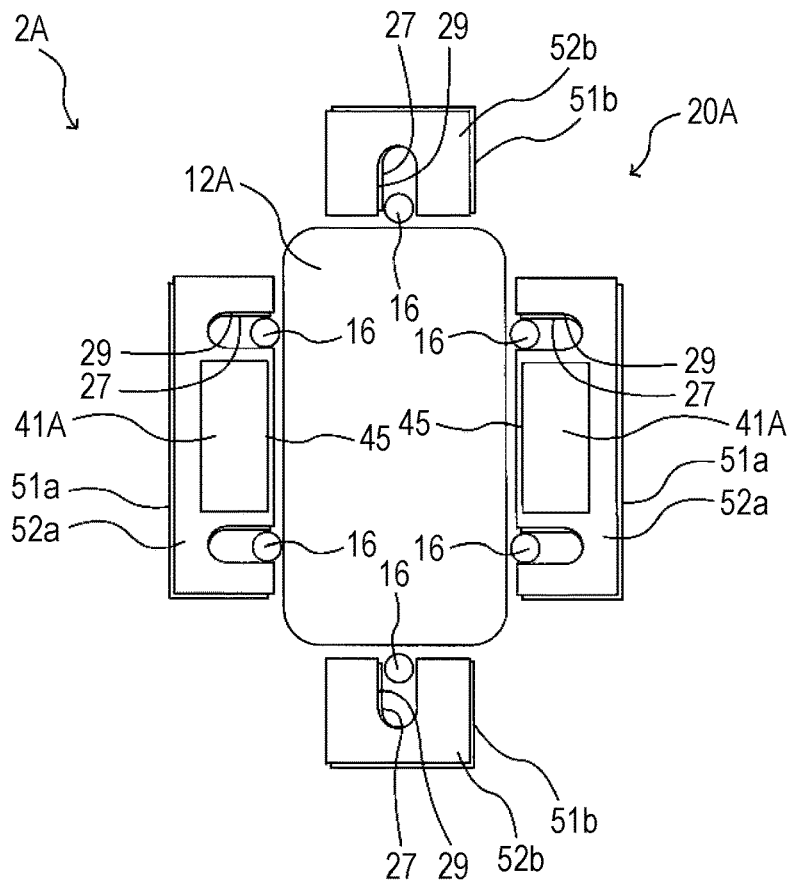
FIG. 5 is a plan view illustrating an example of the configuration of the lid feeding apparatus in a modification for feeding a rectangular lid.

As illustrated in FIG. 5, in this modification, a lid 12A to be fed has a substantially rectangular shape when viewed from the up-and-down direction.

A lid separation mechanism 20A includes four lower claws 51 and four upper claws 52. The lower claws 51 (51a and 51b) and the upper claws 52 (52a and 52b) have similar configurations to the lower claws 21 (21a and 21b) and the upper claws 22 (22a and 22b) of the embodiment. However, the upper claw and the lower claw are formed in such a manner as to have lengths corresponding to the long side and the short side of the substantially rectangular lid 12A, respectively.

Moreover, a pinching claw 41A of the lift mechanism 40 also has a similar configuration to the pinching claw 41 of the embodiment. However, the pinching claw 41A is formed in such a manner as to have a length corresponding to the long side of the substantially rectangular lid 12A.

According to the lid feeding apparatus 2A of this modification, it is possible to handle the rectangular lid 12A by moving the lower claws 51, the upper claws 52, and the pinching claws 41A, which have such forms as described above, to positions accommodating the shape and size of the lid 12A via the unillustrated bases 33 and rails 34.

(5-2. Case of Feeding Circular Lids)

This modification is an example where the lid feeding apparatus is applied for circular lids. An example of the configuration of a lid feeding apparatus 2B of this modification is illustrated in FIG. 6.

Figure 6:
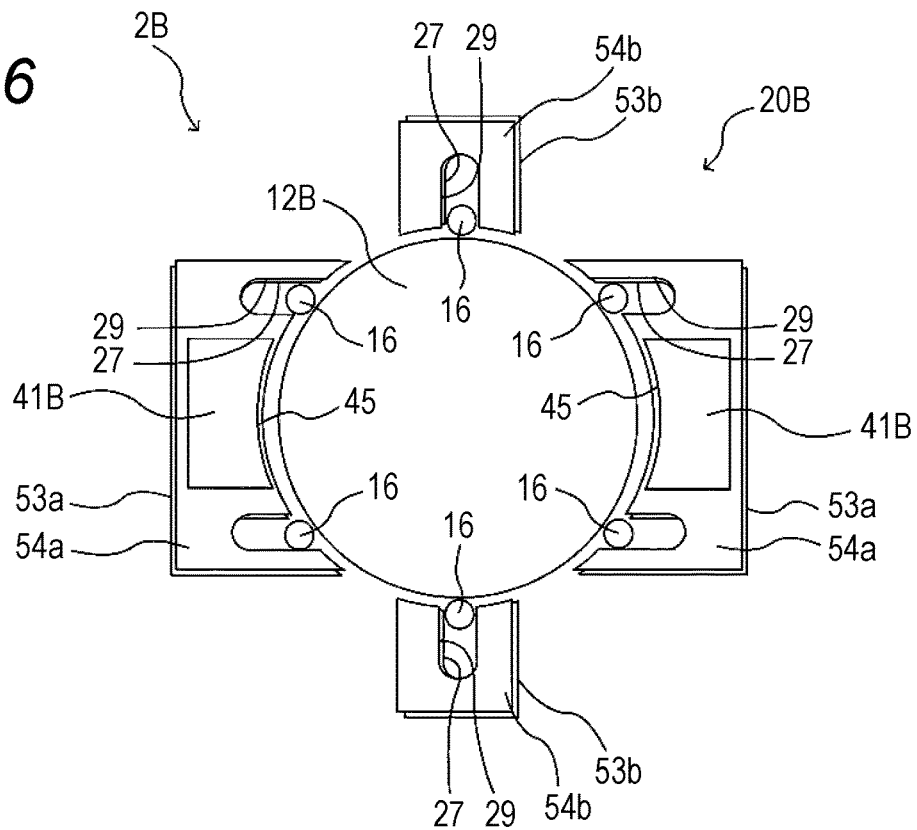
FIG. 6 is a plan view illustrating an example of the configuration of the lid feeding apparatus in a modification for feeding a circular lid.

As illustrated in FIG. 6, in this modification, a lid 12B to be fed has a substantially circular shape when viewed from the up-and-down direction.

A lid separation mechanism 20B includes four lower claws 53 and four upper claws 54. Each of the lower claws 53 (53a and 53b) and the upper claws 54 (54a and 54b) is formed in such a manner as to have an arc shape matching an outer peripheral portion of the lid 12B. An inner periphery of the lid 12B here has a substantially circular shape.

Moreover, each of pinching claws 41B of the lift mechanism 40 is also formed in such a manner that the shape of the contact surface 45 on the inner peripheral side is in the form of a cylindrical surface matching the outer peripheral portion of the substantially circular lid 12B.

According to the lid feeding apparatus 2B of this modification, the lower claws 53, the upper claws 54, and the pinching claws 41B, which have such forms as described above, are moved to positions accommodating the shape and size of the lid 12B via the unillustrated bases 33 and rails 34. Consequently, it is possible to handle the circular lid 12B.

(5-3. Case of Feeding Elliptical Lids)

This modification is an example where the lid feeding apparatus is applied for elliptical lids. An example of the configuration of a lid feeding apparatus 2C of this modification is illustrated in FIG. 7.

Figure 7:
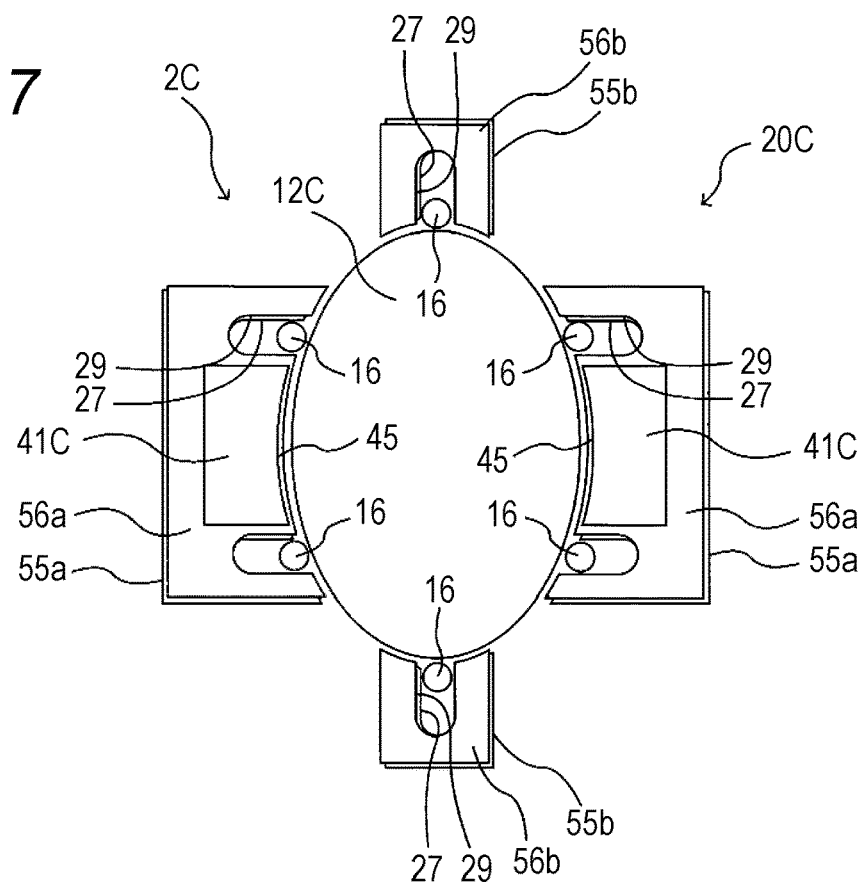
FIG. 7 is a plan view illustrating an example of the configuration of the lid feeding apparatus in a modification for feeding an elliptic lid.

As illustrated in FIG. 7, in this modification, a lid 12C to be fed has an elliptical shape when viewed from the up-and-down direction.

A lid separation mechanism 20C includes four lower claws 55 and four upper claws 56. Each of the lower claws 55 (55a and 55b) and the upper claws 56 (56a and 56b) is formed in such a manner as to have an arc shape matching an outer peripheral portion of the lid 12C. Here, an inner periphery of the lid 12C has a substantially elliptical shape.

Moreover, each of the pinching claws 41C of the lift mechanism 40 is also formed in such a manner that the shape of the contact surface 45 on the inner peripheral side is in the form of a cylindrical surface matching the outer peripheral portion of the substantially elliptical lid 12C.

According to the lid feeding apparatus 2C of this modification, the lower claws 55, the upper claws 56, and the pinching claws 41C, which have such forms as described above, are moved to positions accommodating the shape and size of the lid 12C via the unillustrated bases 33 and rails 34. Consequently, it is possible to handle the elliptical lid 12C.

(5-4. Case of Feeding Polygonal Lids)

This modification is an example where the lid feeding apparatus is applied for polygonal lids. An example of the configuration of a lid feeding apparatus 2D of this modification is illustrated in FIG. 8.

Figure 8:
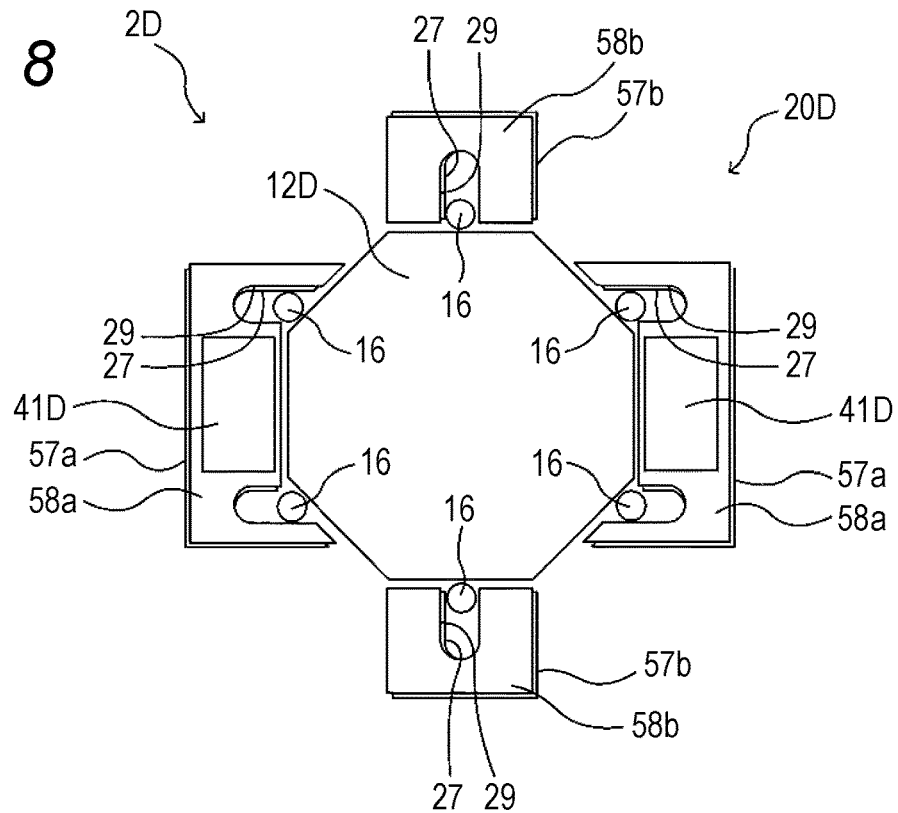
FIG. 8 is a plan view illustrating an example of the configuration of the lid feeding apparatus in a modification for feeding a polygonal lid.

As illustrated in FIG. 8, in this modification, a lid 12D to be fed has an octagonal shape when viewed from the up-and-down direction.

A lid separation mechanism 20D includes four lower claws 57 and four upper claws 58. Each of the lower claws 57 (57a and 57b) and the upper claws 58 (58a and 58b) is formed in such a manner as to have a shape matching an outer peripheral portion of the lid 12D and a length corresponding to the side of the octagonal lid 12D. Here, an inner periphery of the lid 12D has an octagonal shape.

Moreover, a pinching claw 41D of the lift mechanism 40 has a similar configuration to the pinching claw 41 of the embodiment. However, the pinching claw 41D is formed in such a manner as to have a length corresponding to one side of the octagonal lid 12D.

According to the lid feeding apparatus 2D of this modification, it is possible to handle the octagonal lid 12D by moving the lower claws 57, the upper claws 58, and the pinching claws 41D, which have such forms as described above, to positions accommodating the shape and size of the lid 12D via the unillustrated bases 33 and rails 34.

(5-5. Others)

In the above description, the case where the first actuator 42, the second actuator 43, the third actuator 31, and the fourth actuator 32 include an air cylinder has been described as an example. However, the actuators used in the embodiment are not limited to this. The actuator may include, for example, a solenoid or servo motor. Moreover, in the above description, the case where the fifth actuator 37 includes a servo motor has been described as an example. However, the fifth actuator may be configured of, for example, an air cylinder or solenoid.

Moreover, in the above description, after the lift mechanism 40 lifts the lids 12 up, the lifted lids 12 are released without being lowered. However, the operation of lowering the lids 12 may be performed. In this case, for example, when the flow returns from step S70 to step S10 in the above-mentioned FIG. 4, the pinching claws 41 are simply required to be withdrawn to the side opposite to the lids 12 after being moved down the predetermined distance L. Consequently, an impact on the lids 12 can be reduced when the lids 12 lifted up by the lift mechanism 40 are released.

When the above description includes a term "vertical", "parallel", "plane", or the like, its meaning should not be strictly interpreted. In other words, design and manufacturing tolerances and errors are permitted in these terms "vertical", "parallel", and "plane". In other words, these terms indicate "substantially vertical," "substantially parallel," and "substantially plane."

Moreover, when a dimension, size, shape, position, or the like in terms of the external appearance is described as "identical", "same", "equal", "different", or the like in the above description, its meaning should not be strictly interpreted. In other words, design and manufacturing tolerances and errors are permitted in these terms "identical", "same", "equal", and "different". In other words, these terms indicate "substantially identical," "substantially same," "substantially equal", and "substantially different."

Moreover, in addition to those described above, the embodiment and the methods by the modifications may be used in combination as appropriate. In addition, although specific illustrations are not presented, the embodiment and the modifications may be carried out by making various changes thereto within the scope that does not depart from their gist.

The container feeding apparatus of the present disclosure may be the following first to ninth container feeding apparatuses:

The first container feeding apparatus is characterized by including: a guide member configured to guide a stacking direction of containers; a separation mechanism configured to separate the containers, one by one, from a plurality of the containers stacked along the guide member; and a lift mechanism configured to, upon the separation mechanism separating the containers, support the remaining containers excluding at least one on the bottom side of the plurality of stacked containers and lift the remaining containers up a predetermined distance.

The second container feeding apparatus is the first container feeding apparatus characterized in that the lift mechanism includes: a first support member configured to support the remaining containers; a first actuator configured to move the first support member up and down in a direction along the guide member; and a second actuator configured to move the first support member to and fro in a direction intersecting with the guide member.

The third container feeding apparatus is the second container feeding apparatus characterized in that the first support member supports the remaining containers while in contact with outer peripheries of a plurality of the containers located immediately above the at least one container on the bottom side.

The fourth container feeding apparatus is the third container feeding apparatus characterized in that the first support member has an uneven shape on a contact surface with the container.

The fifth container feeding apparatus is any of the second to fourth container feeding apparatuses characterized in that the separation mechanism includes: a second support member configured to support the container located at the bottom of the stacked containers; a third actuator configured to move the second support member to and fro in the direction intersecting with the guide member; a third support member configured to support the second container from the bottom of the stacked containers; and a fourth actuator configured to move the third support member to and fro in the direction intersecting with the guide member.

The sixth container feeding apparatus is the fifth container feeding apparatus characterized in that the separation mechanism includes: a suction pad configured to suction the container located at the bottom; and a fifth actuator configured to move the suction pad up and down in the direction along the guide member.

The seventh container feeding apparatus is the sixth container feeding apparatus characterized by further including a control device configured to control the first actuator, the second actuator, the third actuator, the fourth actuator, and the fifth actuator, wherein the control device executes a first step of moving the second support member to a container side, meanwhile withdrawing the first and third support members to a side opposite to the containers; a second step of moving the first support member to the container side; a third step of moving the first support member up the predetermined distance; a fourth step of moving the third support member to the container side; a fifth step of moving the suction pad up and suctioning the container located at the bottom; and a sixth step of withdrawing the second support member to the side opposite to the containers and moving the suction pad down.

The eighth container feeding apparatus is any of the fifth to seventh container feeding apparatuses characterized by further including a base configured to support the guide member, the first support member, the second support member, and the third support member; and a rail configured to support the base in such a manner as to be movable along the direction intersecting with the guide member.

The ninth container feeding apparatus is any of the fifth to eighth container feeding apparatuses characterized in that the first, second, and third support members are configured to be replaceable according to the shape of the container.

Moreover, a container feeding method of the present disclosure may be characterized by including: supporting the remaining containers excluding at least one on the bottom side of a plurality of the containers stacked along a guide member, and lifting the remaining containers up a predetermined distance; and separating the containers, one by one, from the bottom of the plurality of the containers.

Furthermore, a container mounting system of the present disclosure may be characterized by including: a plurality of any of the first to ninth container feeding apparatuses; and a container mounting robot configured to mount the containers to be sequentially fed from the plurality of the container feeding apparatuses on other containers different from the containers.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A part feeding apparatus comprising:
    a guide to guide stacked parts stacked in a height direction along a height of the part feeding apparatus;
    a separator configured to pick up a bottommost part located at a bottom of the stacked parts in the height direction; and
    a lift configured to lift the stacked parts except for at least the bottommost part, the lift comprising:
        a first support member to support remaining parts that are to be lifted;
        a first actuator configured to move the first support member up and down in the height direction; and
        a second actuator configured to move the first support member to and from in a direction intersecting with the guide,
    wherein the first support member supports the remaining parts while in contact with outer peripheries of a plurality of the stacked parts located immediately above the bottommost part.

2. The part feeding apparatus according to claim 1, wherein
    the separator includes:
    a second support member to support the bottommost part;
    a third actuator configured to move the second support member to and fro in the direction intersecting with the guide;
    a third support member to support a second part that is adjacent to the bottommost part; and
    a fourth actuator configured to move the third support member to and from in the direction intersecting with the guide.

3. The part feeding apparatus according to claim 2, wherein
    the separator includes:
    a suction pad to suction the bottommost part; and
    a fifth actuator configured to move the suction pad up and down in the direction along the guide.

4. The part feeding apparatus according to claim 3, further comprising a control device configured to control the first actuator, the second actuator, the third actuator, the fourth actuator, and the fifth actuator, wherein
    the control device is configured to execute:
    a first step of moving the second support member to a part side, meanwhile withdrawing the first support member and the third support member to a side opposite to the stacked parts;
    a second step of moving the first support member to the part side;
    a third step of moving the first support member up by a distance;
    a fourth step of moving the third support member to the part side;
    a fifth step of moving the suction pad up and suctioning the bottommost part; and
    a sixth step of withdrawing the second support member to the side opposite to the stacked parts and moving the suction pad down.

5. The part feeding apparatus according to claim 2, further comprising:
    a base to support the guide, the first support member, the second support member, and the third support member; and a rail to support the base movably along the direction intersecting with the guide.

6. The part feeding apparatus according to claim 2, wherein
the first support member, the second support member, and the third support member are replaceable according to a shape of one of the stacked parts.

7. The part feeding apparatus according to claim 1, wherein the separator separates the stacked parts one by one.

8. The part feeding apparatus according to claim 1, further comprising:
a control circuit configured to control the separator to pick up the bottommost part while the lift lifts the stacked parts except for the at least the bottommost part.

9. The part feeding apparatus according to claim 1, wherein
the first support member has an uneven shape on a contact surface with one of the stacked parts.

10. The part feeding apparatus according to claim 1, wherein the stacked parts are constituted by stacked containers.

11. A part mounting system comprising:
a plurality of the part feeding apparatuses according to claim 1; and
a part mounting robot configured to mount the parts to be sequentially fed from the plurality of the part feeding apparatuses on other parts different from the parts.

* * * * *